(12) United States Patent
Mizuno

(10) Patent No.: US 12,243,691 B2
(45) Date of Patent: Mar. 4, 2025

(54) CERAMIC ELECTRONIC DEVICE

(71) Applicant: TAIYO YUDEN CO., LTD., Tokyo (JP)

(72) Inventor: Kotaro Mizuno, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 193 days.

(21) Appl. No.: 18/174,493

(22) Filed: Feb. 24, 2023

(65) Prior Publication Data
US 2023/0290576 A1    Sep. 14, 2023

(30) Foreign Application Priority Data

Mar. 10, 2022  (JP) ................................ 2022-037358

(51) Int. Cl.
| | |
|---|---|
| *H01G 4/30* | (2006.01) |
| *H01G 4/008* | (2006.01) |
| *H01G 4/012* | (2006.01) |
| *H01G 4/12* | (2006.01) |

(52) U.S. Cl.
CPC ............... *H01G 4/30* (2013.01); *H01G 4/008* (2013.01); *H01G 4/012* (2013.01); *H01G 4/12* (2013.01)

(58) Field of Classification Search
CPC .......... H01G 4/30; H01G 4/008; H01G 4/012; H01G 4/12
See application file for complete search history.

(56) References Cited

U.S. PATENT DOCUMENTS

| | | | | |
|---|---|---|---|---|
| 6,442,813 | B1* | 9/2002 | Sakamoto | H01G 4/30 |
| | | | | 29/25.42 |
| 2004/0090721 | A1* | 5/2004 | Nagai | H01C 1/14 |
| | | | | 361/15 |
| 2009/0237859 | A1* | 9/2009 | Nakamura | H01G 4/33 |
| | | | | 156/89.12 |
| 2012/0162858 | A1* | 6/2012 | Tanaka | H01G 4/1227 |
| | | | | 361/321.4 |
| 2013/0292330 | A1 | 11/2013 | Arai et al. | |
| 2013/0321980 | A1 | 12/2013 | Suzuki et al. | |
| 2015/0155098 | A1 | 6/2015 | Yamaguchi et al. | |
| 2020/0058442 | A1* | 2/2020 | Cha | H01G 4/12 |
| 2020/0066452 | A1* | 2/2020 | Cha | H01G 4/30 |
| 2022/0384111 | A1* | 12/2022 | Iguchi | H01G 4/30 |

FOREIGN PATENT DOCUMENTS

| | | |
|---|---|---|
| JP | 5488725 B2 | 5/2014 |
| WO | 2012053233 A1 | 4/2012 |
| WO | 2014024538 A1 | 2/2014 |

* cited by examiner

*Primary Examiner* — Michael P McFadden
(74) *Attorney, Agent, or Firm* — Law Office of Katsuhiro Arai

(57) ABSTRACT

A ceramic electronic device includes a multilayer chip in which dielectric layers and internal electrode layers are alternately stacked. In an outermost one of the internal electrode layers, a metal oxide containing a main component element constituting the internal electrode layers is provided on an outer main surface of the outermost one, and a formation depth of the metal oxide is 0.5 μm or more and 5.0 μm or less. A segregation layer containing a sub metal element different from the main component metal is present at an interface between at least one of the internal electrode layers other than the outermost one and one of the dielectric layers adjacent to the at least one of the internal electrode layers.

16 Claims, 11 Drawing Sheets

CERAMIC ELECTRONIC DEVICE

CROSS-REFERENCE TO RELATED APPLICATION

This application is based upon and claims the benefit of priority of the prior Japanese Patent Application No. 2022-037358, filed on Mar. 10, 2022, the entire contents of which are incorporated herein by reference.

FIELD

A certain aspect of the present invention relates to a ceramic electronic device.

BACKGROUND

Ceramic electronic devices such as multilayer ceramic capacitors are manufactured by printing metal paste, which is mainly made of metal powder, on dielectric green sheets, which are mainly made of dielectric materials such as barium titanate. The ceramic electronic devices are manufactured through binder removal, firing, application of external electrodes, and the like. In order to meet the market demand for small size and large capacity, there is a demand for reducing the thickness of dielectric layers, reducing the thickness of internal electrode layers, and increasing the number of the layers.

On the other hand, thinning the dielectric layers is accompanied by an increase in electric field strength, making it more difficult to ensure long lifetime. In addition to the study of dielectric material design, such as solid-solving trace amounts of additives such as rare earth oxides in dielectric materials such as barium titanate, in recent years, different types of metal elements are added to the internal electrode layers and an interface design between the dielectric layer and the internal electrode layer is studied (for example, see International Publication No. 2012/053233). It is thought that forming a segregation layer containing an additive metal element at the interface between the dielectric layer and the internal electrode layer strengthens the Schottky barrier and improves the lifetime (for example, see International Publication No. 2014/024538).

SUMMARY OF THE INVENTION

According to an aspect of the present invention, there is provided a ceramic electronic device including: a multilayer chip in which a plurality of dielectric layers of which a main component is a ceramic and a plurality of internal electrode layers of which a main component is a metal are alternately stacked, wherein, in an outermost one of the plurality of internal electrode layers, a metal oxide containing a main component element constituting the plurality of internal electrode layers is provided on an outer main surface of the outermost one, and a formation depth of the metal oxide is 0.5 μm or more and 5.0 μm or less, and wherein a segregation layer containing a sub metal element different from the main component metal of the plurality of internal electrode layers is present at an interface between at least one of the plurality of internal electrode layers other than the outermost one and one of the plurality of dielectric layers adjacent to the at least one of the plurality of internal electrode layers.

According to another aspect of the present invention, there is provided a ceramic electronic device including: a multilayer chip that has a structure in which a plurality of dielectric layers of which a main component is a ceramic and a plurality of internal electrode layers of which a main component is a metal are alternately stacked, and has a substantially rectangular parallelepiped shape, each of the plurality of internal electrode layers being alternately extracted to two end faces of the substantially rectangular parallelepiped shape facing each other, wherein at least one of the plurality of internal electrode layers has a metal oxide containing a main component element constituting the plurality of internal electrode layers and having a formation depth of 0.5 μm or more and 5.0 μm or less is provided on ends of two side faces other than the two end faces of the substantially rectangular parallelepiped shape, wherein a segregation layer containing a sub metal element different from the main component of the plurality of internal electrode layers is present at an interface between at least one of the plurality of internal electrode layers other than an outermost one of the plurality of internal electrode layers and one of the plurality of dielectric layers adjacent to the at least one of the plurality of internal electrode layers, and wherein a number of internal electrode layers in which 60% or more of a thickness thereof is covered with the metal oxide at ends of the two side faces is 80% or more of a total number of the plurality of internal electrode layers.

According to another aspect of the present invention, there is provided a ceramic electronic device including: a multilayer chip in which a plurality of dielectric layers of which a main component is a ceramic and a plurality of internal layers are alternately stacked, wherein, among the plurality of internal layers, a plurality of internal electrode layers other than outermost layers have a metal as a main component, wherein a whole of the outermost layers is a metal oxide containing the metal of the plurality of internal electrode layers, and wherein a segregation layer containing a sub metal element different from the metal of the plurality of internal electrode layers is present at an interface between at least one of the plurality of internal electrode layers and one of the plurality of dielectric layers adjacent to the at least one of the plurality of internal electrode layers.

DETAILED DESCRIPTION

In order to develop desired electrical properties of a multilayer ceramic capacitor, the solid solution state of a trace amount of additive in the dielectric material may be controlled depending on the firing conditions such as the firing temperature and atmosphere. Here, when the oxygen partial pressure is high, the additive metal element added to the internal electrode layer may be ionized and diffused into the dielectric layer. As a result, abnormal grain growth and variations in electrical characteristics of the dielectric layer are induced, which may cause problems. In addition, when the internal electrode layer contains a metal component that is more noble than the main component thereof, although it is resistant to oxidation, oxygen tends to penetrate to the center of the chip. In this case, characteristic deterioration is likely to occur because of accidental local oxidation, such as segregation of trace additives.

A description will be given of an embodiment with reference to the accompanying drawings.

Figure 1:
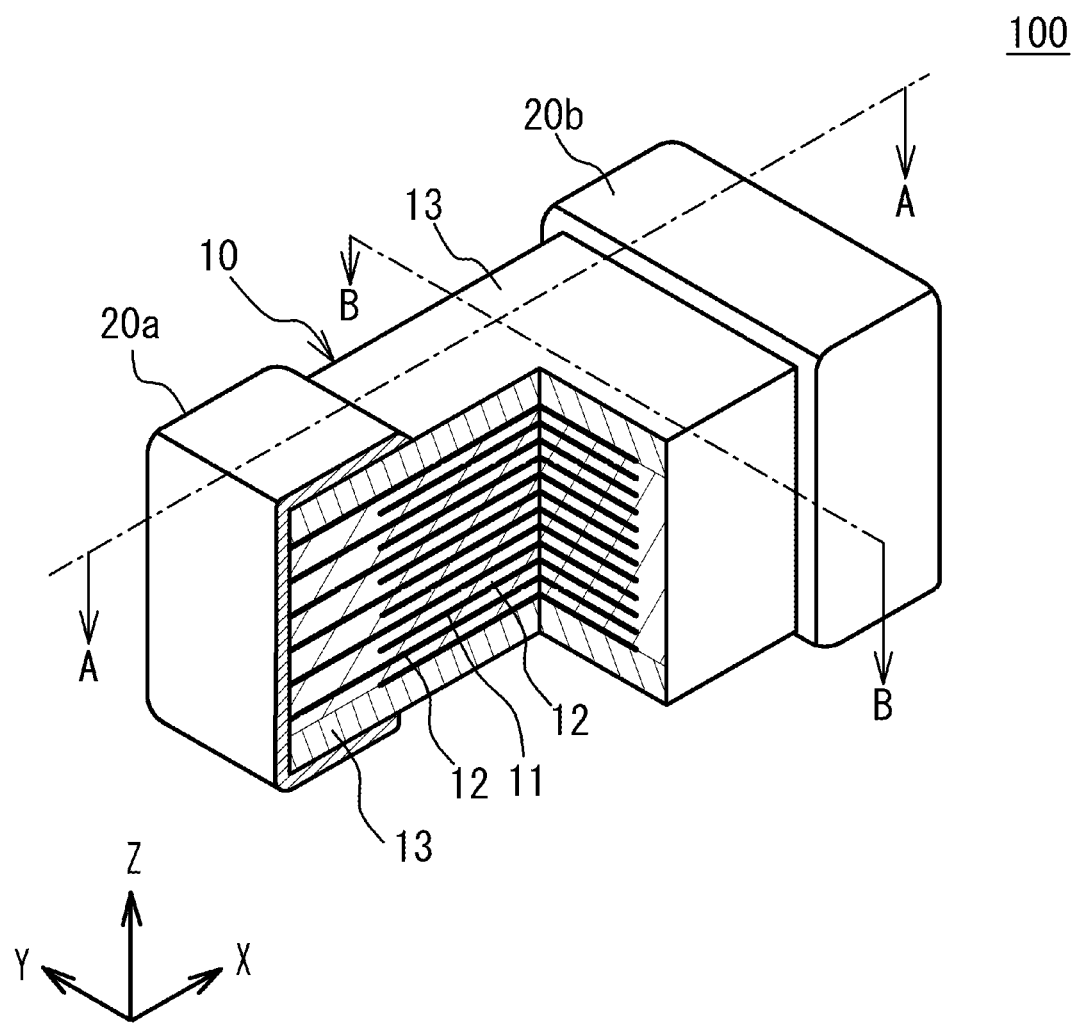
FIG. 1 illustrates a perspective view of a multilayer ceramic capacitor in which a cross section of a part of the multilayer ceramic capacitor is illustrated.
Figure 2:
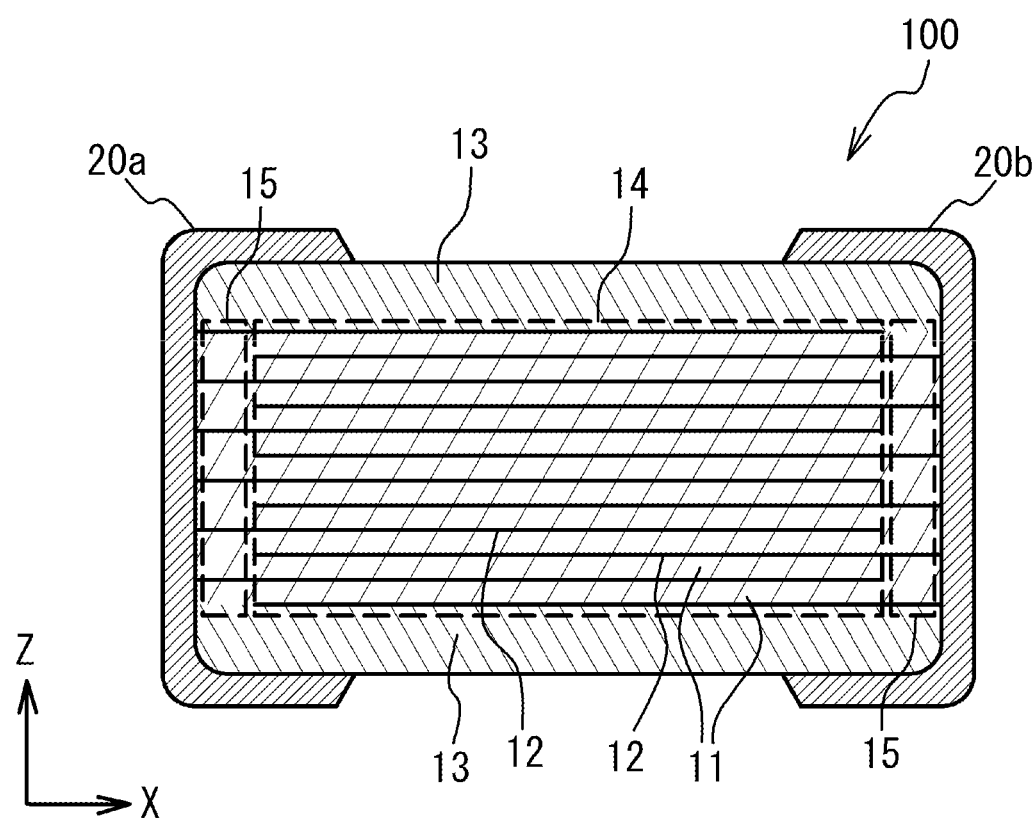
FIG. 2 illustrates a cross sectional view taken along a line A-A of FIG. 1.
Figure 3:
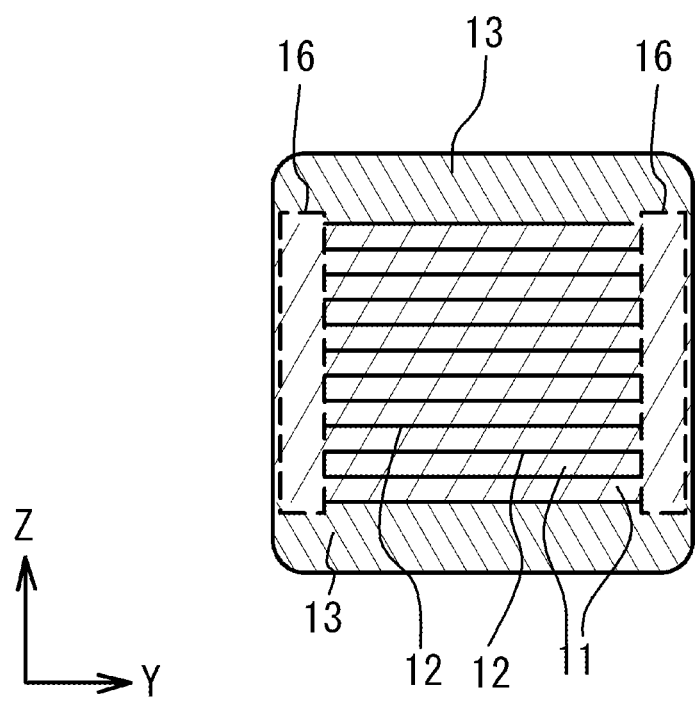
FIG. 3 illustrates a cross sectional view taken along a line B-B of FIG. 1.

(First Embodiment) FIG. 1 illustrates a perspective view of a multilayer ceramic capacitor 100 in accordance with an embodiment, in which a cross section of a part of the multilayer ceramic capacitor 100 is illustrated. FIG. 2 illustrates a cross sectional view taken along a line A-A of FIG. 1. FIG. 3 illustrates a cross sectional view taken along a line B-B of FIG. 1. As illustrated in FIG. 1 to FIG. 3, the multilayer ceramic capacitor 100 includes a multilayer chip 10 having a rectangular parallelepiped shape, and a pair of external electrodes 20a and 20b that are respectively provided at two end faces of the multilayer chip 10 facing each other. In four faces other than the two end faces of the multilayer chip 10, two faces other than an upper face and a lower face of the multilayer chip 10 in a stacking direction are referred to as side faces. The external electrodes 20a and 20b extend to the upper face, the lower face and the two side faces of the multilayer chip 10. However, the external electrodes 20a and 20b are spaced from each other.

In FIG. 1 to FIG. 3, an X-axis direction is a longitudinal direction of the multilayer chip 10. The X-axis direction is a direction in which the two end faces of the multilayer chip 10 are opposite to each other and in which the external electrode 20a is opposite to the external electrode 20b. A Y-axis direction is a width direction of the internal electrode layers. The Y-axis direction is a direction in which the two side faces of the multilayer chip 10 are opposite to each other. A Z-axis direction is a stacking direction. The Z-axis direction is a direction in which the upper face of the multilayer chip 10 is opposite to the lower face of the multilayer chip 10. The X-axis direction, the Y-axis direction and the Z-axis direction are vertical to each other.

The multilayer chip 10 has a structure designed to have dielectric layers 11 and internal electrode layers 12 alternately stacked. The dielectric layer 11 includes ceramic material acting as a dielectric material. The internal electrode layers 12 include a base metal material. End edges of the internal electrode layers 12 are alternately exposed to a first end face of the multilayer chip 10 and a second end face of the multilayer chip 10 that is different from the first end face. In the embodiment, the first end face is opposite to the second end face. The external electrode 20a is provided on the first end face. The external electrode 20b is provided on the second end face. Thus, the internal electrode layers 12 are alternately conducted to the external electrode 20a and the external electrode 20b. Thus, the multilayer ceramic capacitor 100 has a structure in which a plurality of the dielectric layers 11 are stacked and each two of the dielectric layers 11 sandwich the internal electrode layer 12. In a multilayer structure of the dielectric layers 11 and the internal electrode layers 12, two of the internal electrode layers 12 are positioned at outermost layers in a stacking direction. The upper face and the lower face of the multilayer structure that are the internal electrode layers 12 are covered by cover layers 13. A main component of the cover layer 13 is a ceramic material. For example, a main component of the cover layer 13 is the same as that of the dielectric layer 11.

For example, the multilayer ceramic capacitor 100 may have a length of 0.25 mm, a width of 0.125 mm, and a height of 0.125 mm. The multilayer ceramic capacitor 100 may have a length of 0.4 mm, a width of 0.2 mm, and a height of 0.2 mm. The multilayer ceramic capacitor 100 may have a length of 0.6 mm, a width of 0.3 mm, and a height of 0.3 mm. The multilayer ceramic capacitor 100 may have a length of 0.6 mm, a width of 0.3 mm, and a height of 0.110 mm. The multilayer ceramic capacitor 100 may have a length of 1.0 mm, a width of 0.5 mm, and a height of 0.5 mm. The multilayer ceramic capacitor 100 may have a length of 1.0 mm, a width of 0.5 mm, and a height of 0.1 mm. The multilayer ceramic capacitor 100 may have a length of 3.2 mm, a width of 1.6 mm, and a height of 1.6 mm. The multilayer ceramic capacitor 100 may have a length of 4.5 mm, a width of 3.2 mm, and a height of 2.5 mm. However, the size of the multilayer ceramic capacitor 100 is not limited to the above sizes.

A main component of the dielectric layer 11 is a ceramic material having a perovskite structure expressed by a general formula $ABO_3$. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $MgTiO_3$ (magnesium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure. $Ba_{1-x-y}Ca_xSr_yTi_{1-z}Zr_zO_3$ may be barium strontium titanate, barium calcium titanate, barium zirconate, barium titanate zirconate, calcium titanate zirconate, barium calcium titanate zirconate or the like.

Additives may be added to the dielectric layer 11. As additives to the dielectric layer 11, an oxide of Mo (molybdenum), Nb (niobium), Ta (tantalum), W (tungsten), Mg (magnesium), Mn (manganese), vanadium (V), chromium (Cr), or a rare earth element (Y (yttrium), Sn (samarium), Eu (europium), Gd (gadolinium), Tb (terbium), Dy (dysprosium), Ho (holmium), Er (erbium), Tm (thulium) and Yb (ytterbium), or an oxide of Co (cobalt), Ni (nickel), Li (lithium), B (boron), Na (sodium), K (potassium) or Si (silicon), or a glass including cobalt, nickel, lithium, boron, sodium, potassium or silicon.

As illustrated in FIG. 2, a section, in which a set of the internal electrode layers 12 connected to the external electrode 20a face another set of the internal electrode layers 12 connected to the external electrode 20b, is a section generating electrical capacity in the multilayer ceramic capacitor 100. Accordingly, the section is referred to as a capacity section 14. That is, the capacity section 14 is a section in which the internal electrode layers next to each other being connected to different external electrodes face each other.

A section, in which the internal electrode layers 12 connected to the external electrode 20a face each other without sandwiching the internal electrode layer 12 connected to the external electrode 20b, is referred to as an end margin 15. A section, in which the internal electrode layers 12 connected to the external electrode 20b face each other without sandwiching the internal electrode layer 12 connected to the external electrode 20a is another end margin 15. That is, the end margin 15 is a section in which a set of the internal electrode layers 12 connected to one external electrode face each other without sandwiching the internal electrode layer 12 connected to the other external electrode. The end margins 15 are sections that do not generate electrical capacity in the multilayer ceramic capacitor 100.

As illustrated in FIG. 3, a section of the multilayer chip 10 from the two sides thereof to the internal electrode layers 12 is referred to as a side margin 16. That is, the side margin 16 is a section covering edges of the stacked internal electrode layers 12 in the extension direction toward the two side faces. The side margin 16 does not generate electrical capacity.

In order to reduce the size and increase capacity of such multilayer ceramic capacitors, there is a demand for reducing thicknesses of dielectric layers, reducing thicknesses of internal electrode layers, and increasing the number of stacked layers. However, thinning the dielectric layers is accompanied by an increase in electric field strength, making it more difficult to ensure long lifetime. In addition to the study of dielectric material design, such as solid-solving trace amounts of additives such as rare earth oxides in dielectric materials such as barium titanate, in recent years, different types of metal elements are added to the internal electrode layers and an interface design between the dielectric layer and the internal electrode layer is studied. It is thought that forming a segregation layer containing an additive metal element (a sub metal element) at the interface between the dielectric layer and the internal electrode layer strengthens the Schottky barrier and improves the lifetime.

In order to develop the desired electrical properties of a multilayer ceramic capacitor, the solid solution state of a trace amount of additive in the dielectric material may be controlled depending on the firing conditions such as the firing temperature and atmosphere. Here, when the oxygen partial pressure is high, the additive metal element added to the internal electrode layer may be ionized and diffused into the dielectric layer. As a result, abnormal grain growth and variations in electrical characteristics of the dielectric layer are induced, which may cause problems. In addition, when the internal electrode layer contains a metal component that is more noble than the main component thereof, although it is resistant to oxidation, oxygen tends to penetrate to the center of the chip. In this case, characteristic deterioration is likely to occur because of accidental local oxidation, such as segregation of trace additives.

The multilayer ceramic capacitor 100 according to the present embodiment has a segregation layer at the interface between the dielectric layer 11 and the internal electrode layer 12, and has a structure capable of suppressing oxygen penetration into the capacity section 14.

Figure 4:
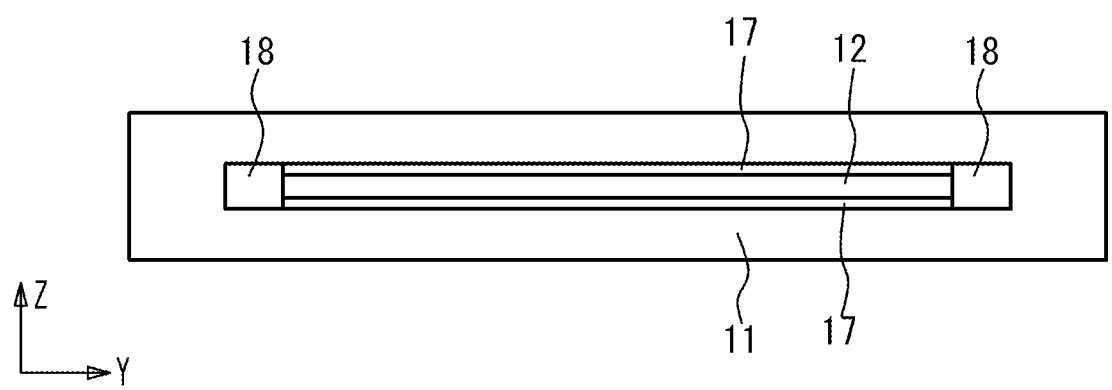
FIG. 4 is a schematic diagram of an internal electrode layer other than outermost layers and two dielectric layers adjacent to the internal electrode layer.

FIG. 4 is a schematic diagram of the internal electrode layers 12 other than the outermost layer and the two dielectric layers 11 adjacent to the internal electrode layers 12. As illustrated in FIG. 4, the internal electrode layer 12 has a segregation layer 17 at the interface between the dielectric layer 11 and the internal electrode layer 12. The segregation layer 17 contains the main component of the internal electrode layers 12 and the additive metal element added to the internal electrode layers 12. It is possible to define the segregation layer 17 as a section which has a concentration equal to or higher than the average concentration of the additive metal element in the entire internal electrode layer 12 when STEM (scanning transmission electron microscope)-EDS (energy dispersive X-ray spectroscopy) line analysis is performed in the stacking direction. Here, the STEM-EDS line analysis is performed at a magnification of 10,000,000 times. Also, the segregation layer 17 has a thickness of 10 nm or less, for example.

By providing the segregation layer 17 at the interface between the dielectric layer 11 and the internal electrode layer 12, the Schottky barrier is strengthened and the lifetime of the multilayer ceramic capacitor 100 is improved. The segregation layer 17 may not be necessarily provided on the entire interface between the internal electrode layer 12 and the dielectric layer 11, and may be provided on at least part of the interface. However, the segregation layer 17 is preferably provided over the entire interface between the internal electrode layers 12 and the dielectric layers 11.

From the viewpoint of sufficiently strengthening the Schottky barrier, it is preferable to set a lower limit to the concentration of the additive metal element in the segregation layer 17. For example, the concentration of the additive metal element in the segregation layer 17 is preferably 1.2 times or more, and preferably 1.5 times or more, and more preferably twice or more than the concentration of the additive metal element in the non-segregating portion of the internal electrode layer 12 other than the segregation layer 17. From the viewpoint of increasing the additive metal element concentration in the entire internal electrode layer 12, the additive metal element concentration in the entire internal electrode layer 12 is preferably 0.01 at % or more, more preferably 0.05 at % or more, and more preferably 0.1 at % or more in terms of effective metal concentration. The effective metal concentration is the metal component concentration added when the main component metal of the internal electrode layer 12 is 100 at %.

When the concentration of the additive metal element in the segregation layer 17 is too high, there is a risk of an increase in ESR due to an increase in electrode resistance, discontinuity or cracking of internal electrodes due to sinterability difference or internal stress difference. Therefore, it is preferable to set an upper limit for the concentration of the additive metal element in the segregation layer 17. For example, the concentration of the additive metal element in the segregation layer 17 is preferably 20 times or less, more preferably 15 times or less, and more preferably 10 times or less than that of the non-segregating portion of the internal electrode layer 12 other than the segregation layer 17. From the viewpoint of keeping the additive metal element concentration in the entire internal electrode layer 12 low, the additive metal element concentration in the entire internal electrode layer 12 is preferably 5 at % or more, more preferably 4 at % or more, and more preferably 3 at % or more in effective metal concentration.

The main component of the internal electrode layer 12 is not particularly limited, but is a base metal such as Ni, Cu (copper), Sn (tin). As a main component of the internal electrode layers 12, noble metals such as Pt (platinum), Pd (palladium), Ag (silver), Au (gold), and alloys containing these may be used.

Although the additive metal element is not particularly limited, it is preferably a metal that is more noble than the main component metal of the internal electrode layers 12. The additive metal elements include, for example, one or more selected from Au, Sn, Cr, Fe (iron), Y, In (indium), As (arsenic), Co, Cu, Ir (iridium), Mg, Os (osmium), Pd, Pt, Re (rhenium), Rh (rhodium), Ru (ruthenium), Se (selenium), Te (tellurium), W, Zn (zinc), Ag, Mo and Ge (germanium).

In addition, as illustrated in FIG. 4, a metal oxide 18 that functions as a passive state is formed on at least one of both ends of the internal electrode layer 12 in the Y-axis direction. The metal oxide 18 contains at least one of the main component metal and the additive metal element of the internal electrode layers 12.

Figure 5:
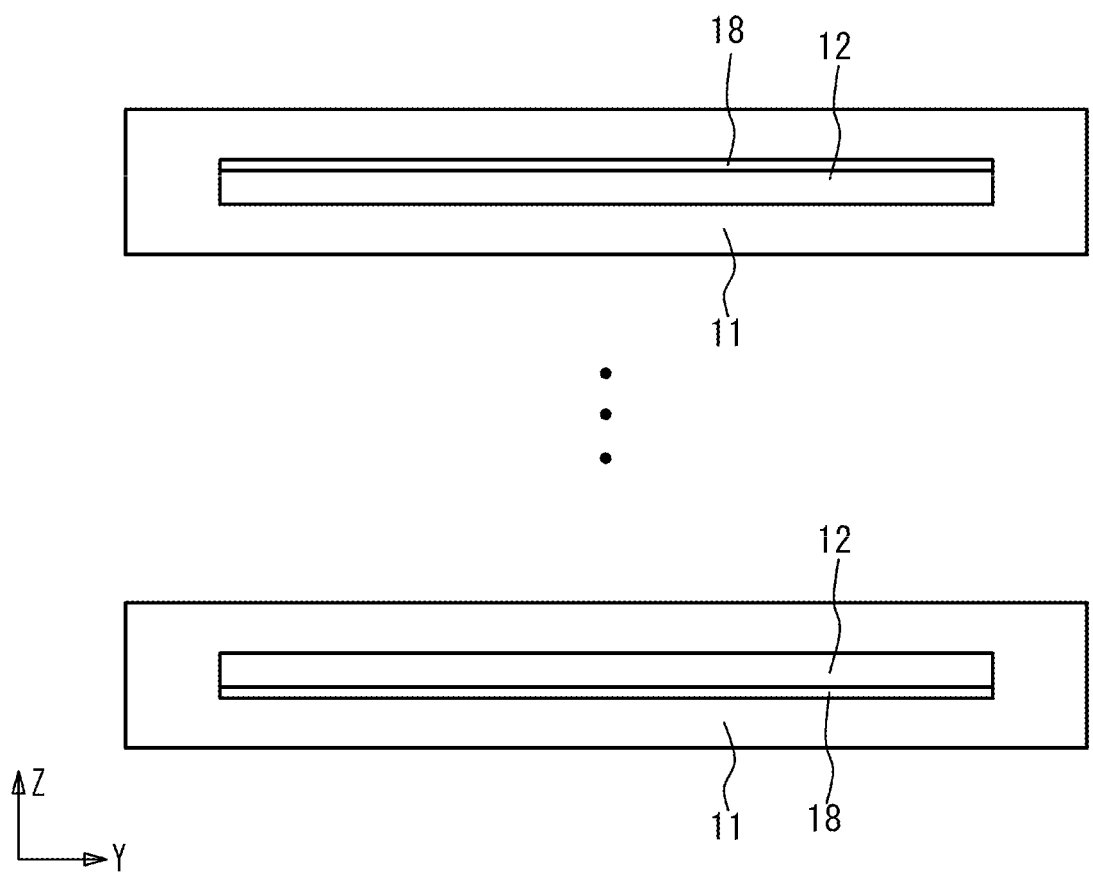
FIG. 5 is a schematic diagram of an outermost internal electrode layer 12.

FIG. 5 is a schematic diagram of the outermost internal electrode layer 12. As illustrated in FIG. 5, the outermost internal electrode layer 12 has the metal oxide 18 formed on the outer main surface thereof. For example, the metal oxide 18 is formed on the upper surface of the uppermost internal electrode layer 12. The metal oxide 18 is formed on the lower surface of the lowermost internal electrode layer 12. In addition, the outermost internal electrode layer 12 may have the metal oxide 18 formed on at least one of both end portions in the Y-axis direction, or may be formed entirely of the metal oxide 18.

Because the metal oxide 18 is an oxide, the metal oxide 18 suppresses passage of oxygen. By providing the metal oxide 18 at the end of each internal electrode layer 12 in the Y-axis direction, oxygen penetration in the Y-axis direction can be suppressed and oxygen penetration into the capacity section 14 can be suppressed. By providing the metal oxide 18 on the outer main surface of the outermost internal electrode layer 12, oxygen penetration in the Z-axis direction can be suppressed and oxygen penetration into the capacity section 14 can be suppressed.

However, when the metal oxide 18 is not formed sufficiently thick, it may not be necessarily possible to sufficiently suppress the penetration of oxygen. Therefore, the thickness of the metal oxide 18 has a lower limit. In this embodiment, the metal oxide 18 has a formation depth of 0.5 μm or more. The formation depth is the thickness in the Y-axis direction when the metal oxide 18 is provided at the end of the internal electrode layer 12 in the Y-axis direction. The formation depth is the thickness in the Z-axis direction when the metal oxide 18 is provided on the outer main surface of the outermost internal electrode layer 12. The formation depth of the metal oxide 18 is obtained, for example, by embedding the multilayer ceramic capacitor 100 in resin, polishing the cross section to the center in the X-axis direction, magnifying it 5000 times with an FE-SEM (Field Emission Scanning Electron Microscope), observing the backscattered electron image, distinguishing the metal portion and the metal oxide portion, and measuring the average length at 10 or more points in the three fields of view. The formation depth of the metal oxide 18 is preferably 0.8 μm or more, more preferably 1.0 μm or more.

On the other hand, when the metal oxide 18 is formed thickly, excessive stress caused by volume expansion may cause cracks and reduce reliability. Therefore, an upper limit is set for the thickness of the metal oxide 18. In this embodiment, the metal oxide 18 has the formation depth of 5.0 μm or less, preferably 4.0 μm or less, and more preferably 3.0 μm or less.

When the metal oxide 18 is not formed sufficiently wide in each of the outermost internal electrode layers 12, there is a risk that the intrusion of oxygen in the Z-axis direction cannot be sufficiently suppressed. Therefore, a lower limit is set for the coverage of the metal oxide 18 with respect to each of the outermost internal electrode layers 12. In this embodiment, the coverage ratio of the metal oxide 18 with respect to each of the outermost internal electrode layers 12 is 80% or more, preferably 85% or more, and more preferably 90% or more. The coverage ratio of the metal oxide 18 with respect to each of the outermost internal electrode layers 12 is the ratio of the area covered by the metal oxide 18 to the entire outer main surface of each of the outermost internal electrode layers 12. The coverage ratio of the metal oxide 18 on each of the outermost internal electrode layers 12 can be determined by embedding the multilayer ceramic capacitor 100 in resin, polishing the cross section to the center, magnifying the cross section by 5000 times with an FE-SEM, observing a backscattered electron image of the cross section, and distinguishing a metal part and a metal oxide part.

In addition, when the metal oxide 18 is not sufficiently formed on the Y-axis direction end of the internal electrode layer 12, there is a possibility that the intrusion of oxygen in the Y-axis direction cannot be sufficiently suppressed. Therefore, a lower limit is set for the coverage ratio of the metal oxide 18 with respect to the ends of all the internal electrode layers 12 in the Y-axis direction. In the present embodiment, the coverage ratio of the metal oxide 18 with respect to the Y-axis direction ends of all the internal electrode layers 12 is 80% or more, preferably 85% or more, and preferably 90% or more. The coverage ratio of the metal oxide 18 with respect to the Y-axis direction ends of all the internal electrode layers 12 means a ratio of the number of the internal electrode layers in which the metal oxide 18 covers 60% or more of the thickness of each internal electrode layer 12 at both Y-axis direction ends to the total number of the internal electrode layers 12 in the multilayer chip 10. The coverage ratio of the metal oxide 18 with respect to the Y-axis direction ends of all the internal electrode layers 12 is determined by exposing, for example, the cross section of the multilayer ceramic capacitor 100 illustrated in FIG. 2, taking a backscattered electron image by using a microscopy such as a scanning transmission electron microscopy, and distinguishing the metal portion and the metal oxide portion.

It is preferable that the segregation layer 17 is not formed between the metal oxide 18 and the internal electrode layer 12 at least in part of the portion where the metal oxide 18 is formed. In this case, the diffusion of the main component and the additive metal element of the internal electrode layer 12 is promoted between the internal electrode layer 12 and the metal oxide 18, and the bonding strength between the internal electrode layer 12 of which the main component is a metal, and the metal oxide 18 is maintained. Moreover, the stress caused by rapid volumetric expansion of the metal oxide 18 is relieved.

In at least a part of the portion where the metal oxide 18 is formed, it is preferable that the segregation layer 17 does not divide the inside of the metal oxide 18, and the main component and the additive metal element of the internal electrode layer 12 are uniformly arranged. With this configuration, the intrusion of oxygen can be blocked more uniformly.

The thickness of the dielectric layer 11 per layer is, for example, 0.3 μm or more and 10 μm or less, or 0.4 μm or more and 8 μm or less, or 0.5 μm or more and 5 μm or less. In general, the thinner the dielectric layer 11 is, the more likely it is to be affected by the diffusion of the additive metal element added to the internal electrode layer 12 and the local oxidation of the internal electrode layer 12, so that the electrical characteristics are likely to fluctuate. Also in the present embodiment, as the dielectric layer 11 is made thinner, it is expected that a greater effect will be exhibited. The thickness of the dielectric layer 11 per layer is obtained by exposing the cross section of the multilayer ceramic capacitor 100, for example, as illustrated in FIG. 2 by mechanical polishing, and measuring the average value of 10 thicknesses of 10 points an image captured by a microscopy such as a scanning transmission electron microscopy.

The thickness of each internal electrode layer 12 is, for example, 0.1 µm or more and 2 µm or less, or 0.2 µm or more and 1 µm or less, or 0.3 µm or more and 0.8 µm or less. As the internal electrode layer 12 becomes thinner, local oxidation is more likely to occur due to an increase in the surface ratio. In this embodiment, it is expected that a greater action and effect will be exhibited. However, when the thickness of the internal electrode layer 12 is less than 0.05 µm, the thickness ratio of the segregation layer 17 becomes too high with respect to the thickness of the internal electrode layer 12, resulting in an increase in ESR (equivalent series resistance), internal electrolytic oxidation. Moreover, there is a possibility that the influence of the sinterability of the internal electrode layer cannot be ignored. The thickness of the internal electrode layer 12 per layer is obtained by exposing, for example, the section of the multilayer ceramic capacitor 100 illustrated in FIG. 2 by mechanical polishing, and measuring the average value of 10 thicknesses of 10 points an image captured by a microscopy such as a scanning transmission electron microscopy.

Figure 6:
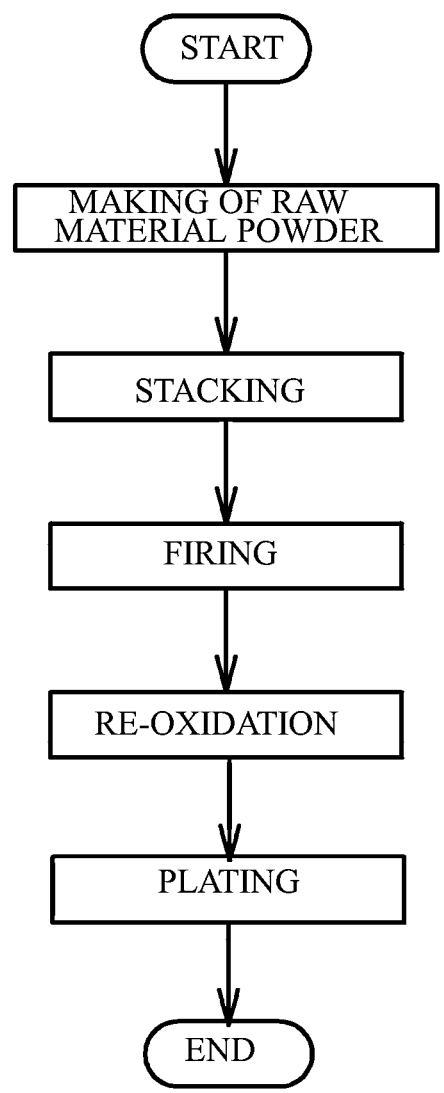
FIG. 6 illustrates a manufacturing method of a multilayer ceramic capacitor.

Next, a description will be given of a manufacturing method of the multilayer ceramic capacitors 100. FIG. 6 illustrates a manufacturing method of the multilayer ceramic capacitor 100.

(Making process of raw material powder) A dielectric material for forming the dielectric layer 11 is prepared. The dielectric material includes the main component ceramic of the dielectric layer 11. Generally, an A site element and a B site element are included in the dielectric layer 11 in a sintered phase of grains of $ABO_3$. For example, $BaTiO_3$ is tetragonal compound having a perovskite structure and has a high dielectric constant. Generally, $BaTiO_3$ is obtained by reacting a titanium material such as titanium dioxide with a barium material such as barium carbonate and synthesizing barium titanate. Various methods can be used as a synthesizing method of the ceramic structuring the dielectric layer 11. For example, a solid-phase method, a sol-gel method, a hydrothermal method or the like can be used. The embodiments may use any of these methods.

An additive compound may be added to the resulting ceramic powder, in accordance with purposes. The additive compound may be an oxide of Mo, Nb, Ta, Mg, Mn, V, Cr or a rare earth element (Y, Sm, Eu Gd, Tb, Dy, Ho, Er, Tm and Yb), or an oxide of Co, Ni, Li, B, Na, K and Si. The additive compound may be a glass including Co, Ni, Li, B, Na, K or Si. Among them, $SiO_2$ mainly acts as a sintering agent.

For example, the resulting ceramic raw material powder is wet-blended with additives and is dried and crushed. Thus, a ceramic material is obtained. For example, the particle diameter may be adjusted by crushing the resulting ceramic material as needed. Alternatively, the grain diameter of the resulting ceramic power may be adjusted by combining the crushing and classifying. With the processes, a dielectric material is obtained.

(Stacking process) Next, a binder such as polyvinyl butyral (PVB) resin, an organic solvent such as ethanol or toluene, and a plasticizer are added to the resulting dielectric material and wet-blended. With use of the resulting slurry, a dielectric green sheet 52 is painted on a base material 51 by, for example, a die coater method or a doctor blade method, and then dried. The base material 51 is, for example, PET (polyethylene terephthalate) film.

Figure 7A:
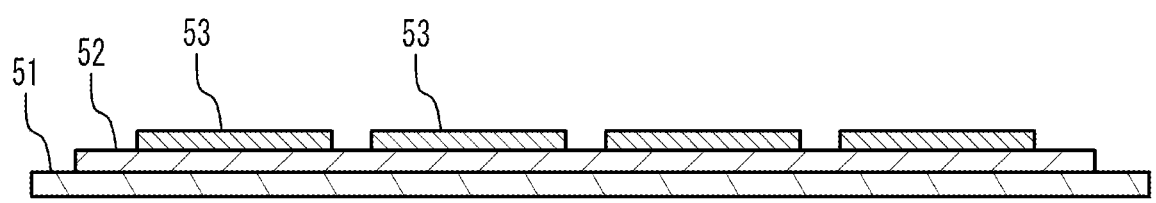
FIG. 7A and FIG. 7B illustrate a stacking process.

Next, as illustrated in FIG. 7A, an internal electrode pattern 53 is formed on the dielectric green sheet 52. In FIG. 7A, as an example, four parts of the internal electrode pattern 53 are formed on the dielectric green sheet 52 and are spaced from each other. The dielectric green sheet 52 on which the internal electrode pattern 53 is formed is a stack unit.

For the internal electrode patterns 53 other than those for the outermost internal electrode layer 12, an organometallic complex solution containing an additive metal element or a fine powder containing the additive metal element is added. The additive metal element may have the form of a single metal, an alloy, an oxide, or the like. As a method of introducing the additive metal element, the surface of the main component metal of the internal electrode pattern 53 may be coated with the additive metal element.

When the amount of the additive metal element is small, the segregation layer 17 may not be sufficiently formed. Therefore, it is preferable to set a lower limit for the amount of the additive metal element added. For example, the amount of the additive metal element to be added is preferably 0.01 at % or more in terms of effective metal concentration with respect to the main component metal of the internal electrode pattern 53, and is more preferably 0.05 at % or more, and still more preferably 0.1 at % or more.

On the other hand, when the amount of the additive metal element is large, the effects of diffusion of the additive metal element into the dielectric layer 11, oxidation of the internal electrode layer 12, deterioration of the sinterability of the internal electrode layer 12, and the like may not be negligible. Therefore, it is preferable to set an upper limit for the amount of the additive metal element added. For example, the amount of the additive metal element to be added is preferably 5.0 at % or less, more preferably 4.0 at % or less, and still more preferably 3.0 at % or less, in effective metal concentration with respect to the main component metal of the internal electrode pattern 53.

Figure 8A:
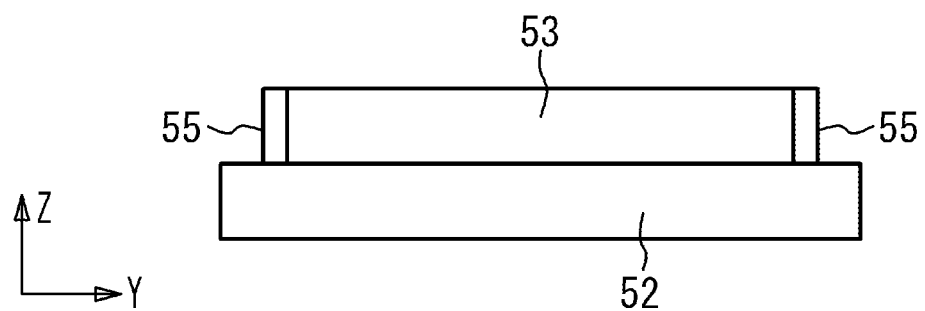
FIG. 8A and FIG. 8B illustrate printing of a paste material.

Regarding the internal electrode patterns 53 other than those for the outermost internal electrode layers 12, after that, as illustrated in FIG. 8A, a paste material 55 having an effective metal concentration of the added metal element of less than 0.01 at % with respect to the main component metal of the internal electrode pattern 53 is printed on both ends in the Y axis direction. The main component metal of the paste material 55 is the same as the main component metal of the internal electrode pattern 53. Alternatively, a paste material containing no additive metal element is printed. Alternatively, a paste of the main component metal of the internal electrode pattern 53 may be overlaid and printed on the film containing the additive metal element so that the effective metal concentration is less than 0.01 at %. As a method of forming the internal electrode pattern 53 and the paste material 55, sputtering, vapor deposition, plating, or the like may be used other than printing.

For the internal electrode patterns 53 other than those for the outermost internal electrode layer 12, a fine powder containing less than 0.01 at % of additive metal element with respect to the main component metal is used. Alternatively, as exemplified in FIG. 8B, the paste material 55 may be overlaid and printed on a film 56 containing the additive metal element so that the effective metal concentration is less than 0.01 at %. In this case, the film formation method may be sputtering, vapor deposition, plating, or the like, in addition to printing.

Figure 7B:
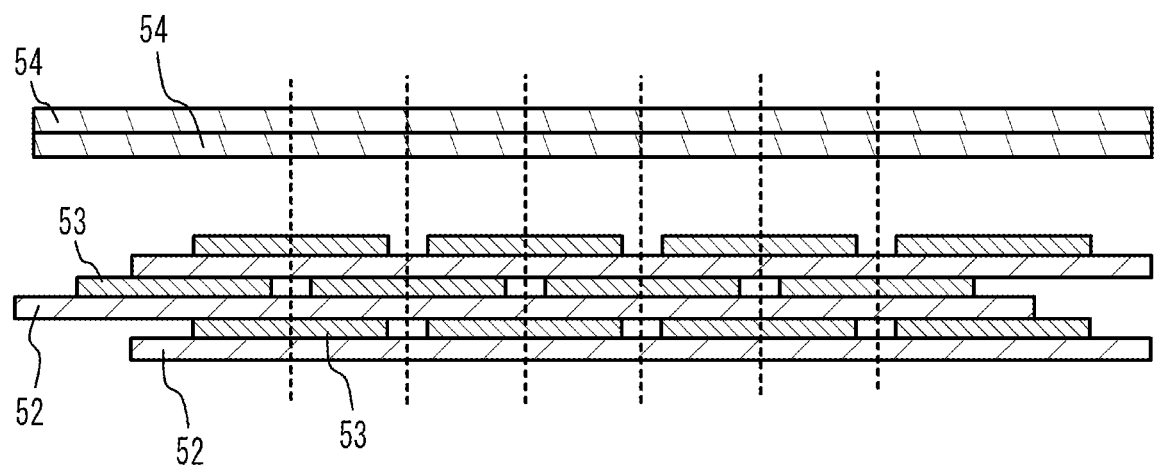
Figure 8B:
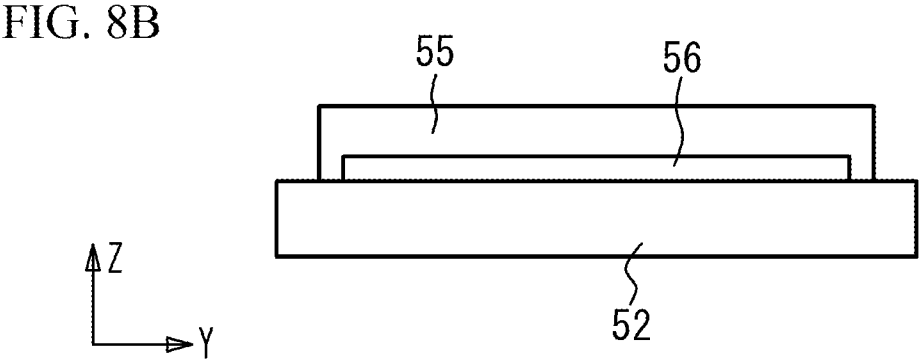

Next, the dielectric green sheets 52 are peeled from the base materials 51. As illustrated in FIG. 7B, the stack units are stacked. In this case, as for the stack unit of the lowest layer, the stack unit of FIG. 8B is turned upside down. A plurality of stack units illustrated in FIG. 8A are stacked thereon, and the uppermost stack unit is stack without inverting the stack unit illustrated in FIG. 8B.

A predetermined number (for example, 2 to 10) of a cover sheet 54 is stacked on an upper face and a lower face of a ceramic multilayer structure of the stacked stack units and is thermally crimped. The resulting ceramic multilayer structure is cut into a chip having a predetermined size (for example, 1.0 mm×0.5 mm). In FIG. 7B, the multilayer structure is cut along a dotted line. The components of the cover sheet 54 may be the same as those of the dielectric green sheet 52. Additives of the cover sheet 54 may be different from those of the dielectric green sheet 52.

(Firing process) The binder is removed from the ceramic multilayer structure in $N_2$ atmosphere. A metal paste to be the base layer of the external electrodes 20a and 20b is applied to the both end faces of the ceramic multilayer structure by a dipping method. The resulting ceramic multilayer structure is fired for 10 minutes to 2 hours in a reductive atmosphere having an oxygen partial pressure of $10^{-5}$ to $10^{-8}$ atm in a temperature range of 1100 degrees C. to 1300 degrees C. In order to form the metal oxides 18 on the internal electrode layers 12, they are exposed to a high temperature of 1000° C. or higher in an atmosphere having an oxygen partial pressure of $10^{-7}$ atm or higher for 10 minutes or longer. Thus, the multilayer ceramic capacitor 100 is obtained.

(Re-oxidizing process) After that, a re-oxidizing process may be performed in $N_2$ gas atmosphere in a temperature range of 600 degrees C. to 1000 degrees C.

(Plating process) After that, by a plating process, plated layers of Cu, Ni, Sn or the like may be formed on the external electrodes 20a and 20b.

According to the manufacturing method of the present embodiment, for the internal electrode patterns 53 other than those for the outermost internal electrode layers 12, an additive metal element is added in addition to the main component metal of the internal electrode layers 12. As a result, the segregation layer 17 is formed at the interface between the internal electrode layers 12 other than the outermost layer and the adjacent dielectric layers 11.

Since the effective metal concentration of the additive metal element in the internal electrode pattern 53 of the outermost layer is less than 0.01 at %, the metal oxide 18 can be formed on the outer main surface of the outermost internal electrode layer 12. In the manufacturing method of this embodiment, the firing conditions are adjusted so that the formation depth of the metal oxide 18 is 0.5 μm or more and 5.0 μm or less. Further, the firing conditions are adjusted so that the coverage ratio of the metal oxide 18 on the outer main surface of the outermost internal electrode layer 12 is 80% or more.

In addition, since the paste material having an effective metal concentration of the additive metal element of less than 0.01 at % is printed on both ends of the internal electrode pattern 53 other than the outermost layer in the Y-axis direction, the metal oxide 18 is formed on the both ends. In addition, in the manufacturing method of the present embodiment, the firing conditions are adjusted so that the formation depth of the metal oxide 18 is 0.5 μm or more and 5.0 μm or less. Also, the firing conditions are adjusted so that the coverage ratio of the metal oxide 18 with respect to the Y-axis direction end portions of all the internal electrode layers 12 is 80% or more.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

EXAMPLES

Hereinafter, the multilayer ceramic capacitor according to the embodiment was manufactured and its characteristics were investigated.

(Example 1) A chip shape having a size of 1.0 mm×0.5 mm×0.5 mm was obtained by stacking, crimping, cutting, removing binder, and firing stacked stack units in which a Ni paste containing Ni powder was printed on a dielectric green sheet containing barium titanate as a dielectric material. The thickness of the dielectric layer was 0.8 μm. The thickness of the internal electrode layer was 0.6 μm. Each number of layers of the dielectric layers and the internal electrode layers was 470.

At this time, an organometallic complex solution or fine powder containing Au as an additive metal element was added to the internal electrode patterns formed of a Ni paste excluding the outermost layers and both ends in the Y-axis direction. The effective metal concentration was 1.0 at % with respect to Ni in the Ni paste. Another Ni paste having the effective metal concentration of less than 0.01 at % was printed on both ends of each internal electrode pattern in the Y-axis direction. During the firing process, a segregation layer was formed at the interface between the dielectric layer and the internal electrode layer. Also, a metal oxide was formed on both ends in the Y-axis direction.

In the outermost internal electrode patterns, in order not to form a segregation layer at the interface between the dielectric layer and the internal electrode layer, a Ni paste material was used in which the effective metal concentration of Au was less than 0.01 at % with respect to Ni. In the firing process, a metal oxide was formed on the outer main surface of the outermost internal electrode layers.

The coverage ratio of the metal oxide on each of outermost internal electrode layers was 100%. The coverage ratio of the metal oxide on the Y-axis direction ends of all the internal electrode layers was also 100%. The formation depth of the metal oxide was 5.0 μm.

(Example 2) In Example 2, the printing range was narrowed when printing a Ni paste material having an effective metal concentration of Au of less than 0.01 at % on both ends in the Y-axis direction. In addition, in the outermost internal electrode layers, the thickness of the Ni paste material having an effective Au metal concentration of 1.0 at % was reduced, and further, the Ni paste material having an effective Au metal concentration of less than 0.01 at % was printed thereon. Other conditions were the same as in Example 1. The coverage ratio of the metal oxide of each of the outermost internal electrode layers was 80%. The coverage ratio of the metal oxide on the Y-axis direction ends of all the internal electrode layers was also 80%. The formation depth of the metal oxide was 0.5 μm.

(Example 3) In Example 3, Au and Fe were used as the additive metal elements. Other conditions were the same as in Example 2. The coverage ratio of the metal oxide of each of the outermost internal electrode layers was 90%. The coverage ratio of the metal oxide on the Y-axis direction ends of all the internal electrode layers was also 90%. The formation depth of the metal oxide was 1.0 μm.

(Example 4) In Example 4, Au and Cr were used as the additive metal elements. Other conditions were the same as in Example 2. The coverage ratio of the metal oxide of each of the outermost internal electrode layers was 90%. The coverage ratio of the metal oxide on the Y-axis direction ends of all the internal electrode layers was also 90%. The formation depth of the metal oxide was 1.0 μm.

(Example 5) In Example 5, Pt was used as the additive metal element. Other conditions were the same as in Example 2. The coverage ratio of the metal oxide of each of the outermost internal electrode layers was 80%. The coverage ratio of the metal oxide on the Y-axis direction ends of all the internal electrode layers was also 80%. The formation depth of the metal oxide was 0.5 μm.

(Example 6) In Example 6, Cu was used as the additive metal element. Other conditions were the same as in Example 2. The coverage ratio of the metal oxide of each of the outermost internal electrode layers was 80%. The coverage ratio of the metal oxide on the Y-axis direction ends of all the internal electrode layers was also 80%. The formation depth of the metal oxide was 0.5 μm.

(Example 7) In Example 7, Fe was used as the additive metal element. Other conditions were the same as in Example 2. The coverage ratio of the metal oxide of each of the outermost internal electrode layers was 95%. The coverage ratio of the metal oxide on the Y-axis direction ends of all the internal electrode layers was also 95%. The formation depth of the metal oxide was 1.0 μm.

(Example 8) In Example 8, Cr was used as the additive metal element. Other conditions were the same as in Example 2. The coverage ratio of the metal oxide of each of the outermost internal electrode layers was 95%. The coverage ratio of the metal oxide on the Y-axis direction ends of all the internal electrode layers was also 95%. The formation depth of the metal oxide was 1.0 μm.

(Example 9) In Example 9, Zn was used as the additive metal element. Other conditions were the same as in Example 2. The coverage ratio of the metal oxide of each of the outermost internal electrode layers was 95%. The coverage ratio of the metal oxide on the Y-axis direction ends of all the internal electrode layers was also 95%. The formation depth of the metal oxide was 1.0 μm.

(Example 10) In Example 10, Y was used as the additive metal element. Other conditions were the same as in Example 2. The coverage ratio of the metal oxide of each of the outermost internal electrode layers was 90%. The coverage ratio of the metal oxide on the Y-axis direction ends of all the internal electrode layers was also 90%. The formation depth of the metal oxide was 1.0 μm.

(Example 11) In Example 11, In was used as the additive metal element. Other conditions were the same as in Example 2. The coverage ratio of the metal oxide of each of the outermost internal electrode layers was 90%. The coverage ratio of the metal oxide on the Y-axis direction ends of all the internal electrode layers was also 90%. The formation depth of the metal oxide was 1.0 μm.

(Comparative example 1) In Comparative Example 1, no additional metal element was added. Other conditions were the same as in Example 1. The coverage ratio of the metal oxide of each of the outermost internal electrode layers was 40%. The coverage ratio of the metal oxide on the Y-axis direction ends of all the internal electrode layers was also 40%. The formation depth of the metal oxide was 0.5 μm.

(Comparative example 2) In Comparative Example 2, the exposure time to a high temperature of 1000° C. or higher in an atmosphere having an oxygen partial pressure of $10^{-7}$ atm or higher was extended in the firing process. Other conditions were the same as in Example 2. The coverage ratio of the metal oxide of each of the outermost internal electrode layers was 30%. The coverage ratio of the metal oxide on the Y-axis direction ends of all the internal electrode layers was also 30%. The formation depth of the metal oxide was 0.5 μm.

(Comparative example 3) In Comparative Example 3, the exposure time to a high temperature of 1000° C. or higher in an atmosphere having an oxygen partial pressure of $10^{-7}$ atm or higher was further extended in the firing process. Other conditions were the same as in Example 1. The coverage ratio of the metal oxide of each of the outermost internal electrode layers was 100%. The coverage ratio of the metal oxide on the Y-axis direction ends of all the internal electrode layers was also 100%. The formation depth of the metal oxide was 10.0 μm.

Figure 9A:
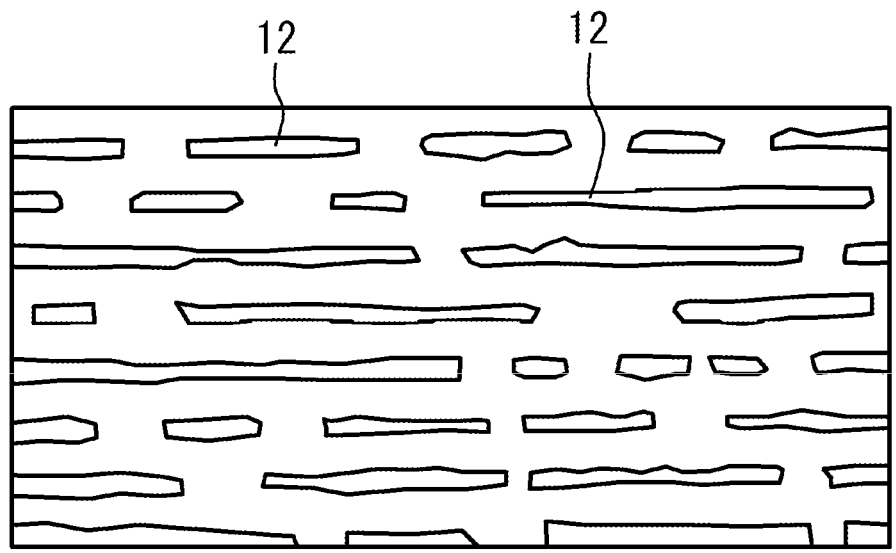
FIG. 9A is a diagram schematically illustrating an SEM photograph of Comparative Example 1.
Figure 9B:
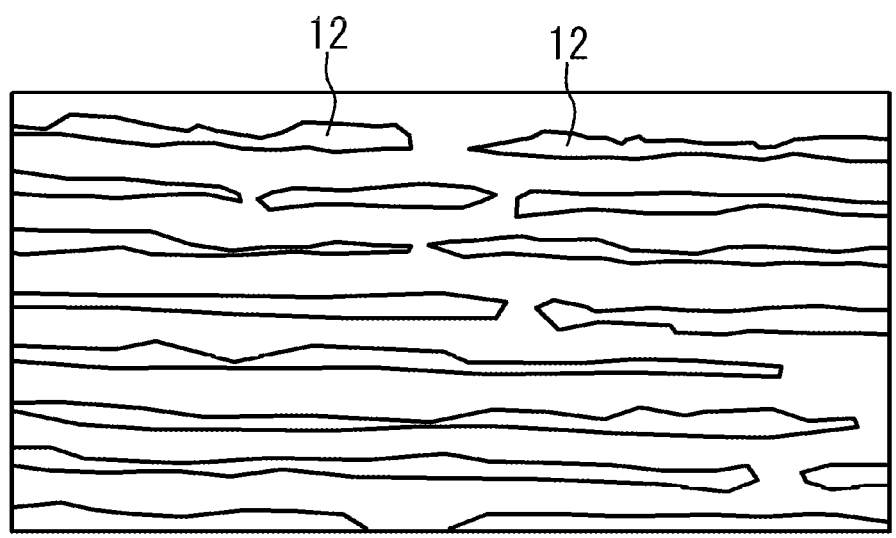
FIG. 9B is a diagram schematically illustrating an SEM photograph of Example 1.

SEM photographs of cross sections were taken for Example 1 and Comparative Example 1. FIG. 9A is a diagram schematically illustrating an SEM photograph of Comparative Example 1. FIG. 9B is a diagram schematically illustrating an SEM photograph of Example 1. It was confirmed that the continuity of the internal electrode layers 12 and the thickness at which a continuous film can be maintained differed depending on the addition of the metal element to the internal electrode layers 12.

Next, STEM-EDS analysis was performed on the interface between the dielectric layer and the internal electrode layer. It was confirmed that a segregation layer of the additive metal element was formed in a thickness range of 10 nm or less at the interface between the dielectric layer and the internal electrode layer.

Figure 10:
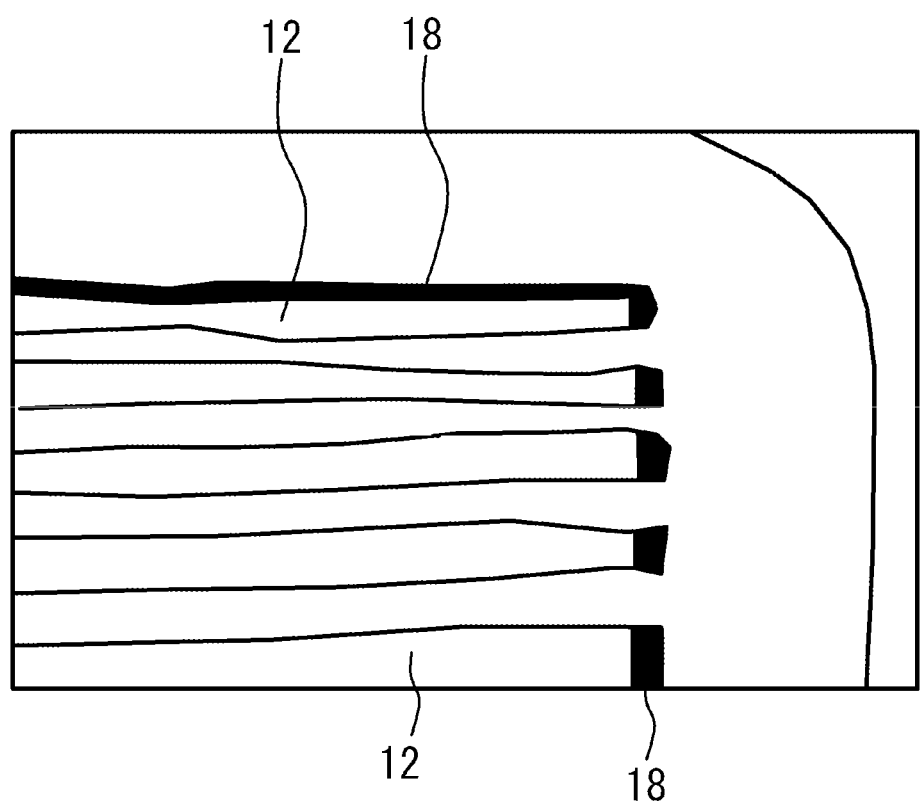
FIG. 10 illustrates an enlarged view of an outermost layer and ends of internal electrode layers.

As illustrated in FIG. 10, it is possible to realize a multilayer ceramic capacitor in which the metal oxide 18 is formed on the outermost layer and the end of the internal electrode. And it is possible to avoid accidental local oxidation and fluctuation of electrical characteristics caused by diffusion of the composite element.

Figure 11:
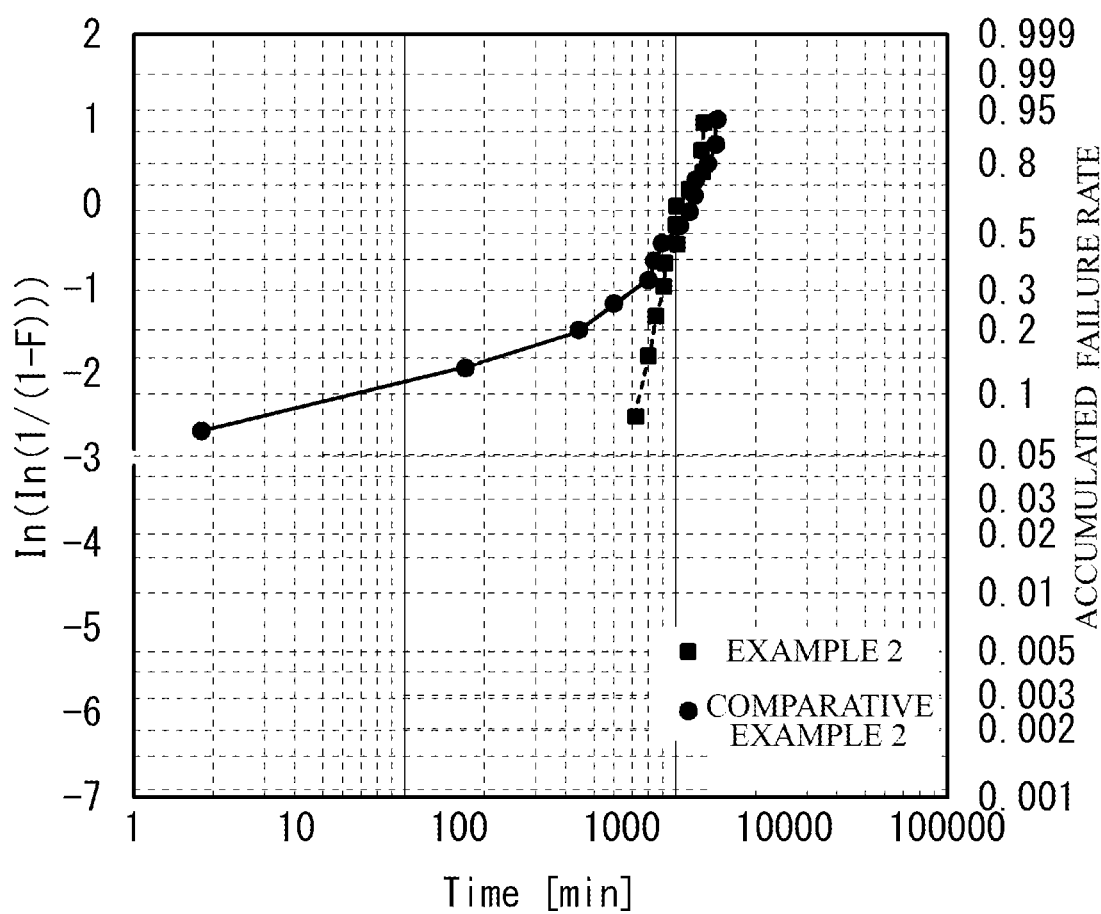
FIG. 11 illustrates Weibull distribution.

The high temperature accelerated life (125° C., 12V) was measured for Examples 1 to 11 and Comparative Examples 1 to 3. Table 1 shows the results. Table 1 shows the 50% life value and them value, which is the slope of the Weibull distribution. FIG. 11 shows the results of Example 2 and Comparative Example 2. Also, the presence or absence of cracks due to excessive metal oxide formation was confirmed. When cracks did not occur, it was determined as good "O". When cracks occurred, it was determined as defective "X".

When the 50% life value was 1000 minutes or more, the m value was 2 or more, and no cracks occurred, it was judged to be "Good". In other cases, it was determined to be defective "x". Examples 1 to 11 were all judged to be good "o". It is considered that this was because a segregation layer was formed, and oxygen intrusion into the capacity section could be suppressed without forming an excessive metal oxide. As described above, in Examples 1 to 11, the frequency of short-lived individuals, which are said to be early failures outside the population, was reduced, and it was confirmed that they were effective in stabilizing production. In contrast, in Comparative Example 1, sufficient life was not obtained. It is considered that this was because no segregation layer was formed. In Comparative Example 2, a sufficient m value was not obtained. It is considered that this was because the coverage ratio of the metal oxide was not sufficient. In Comparative Example 3, cracks occurred. It is considered that this was because the excessive metal oxide was formed.

TABLE 1

| CONDITION | FORMATION DEPTH OF METAL OXIDE (μm) | COVERAGE RATIO OF METAL OXIDE | SEGREGATION ELEMENT | 50% LIFETIME [min] | m VALUE | CRACK | JUDGE |
|---|---|---|---|---|---|---|---|
| COMPARATIVE EXAMPLE 1 | 0.5 | 40 | — | 890 | 3.9 | ○ | x |
| COMPARATIVE EXAMPLE 2 | 0.5 | 30 | Au | 7781 | 0.8 | ○ | x |
| COMPARATIVE EXAMPLE 3 | 10.0 | 100 | Au | 1002 | 1.1 | x | x |
| EXAMPLE 1 | 5.0 | 100 | Au | 10300 | 5.6 | ○ | ○ |
| EXAMPLE 2 | 0.5 | 80 | Au | 10285 | 5.5 | ○ | ○ |
| EXAMPLE 3 | 1.0 | 90 | AuFe | 9020 | 4.3 | ○ | ○ |
| EXAMPLE 4 | 1.0 | 90 | AuCr | 8111 | 3.4 | ○ | ○ |
| EXAMPLE 5 | 0.5 | 80 | Pt | 7750 | 2.5 | ○ | ○ |
| EXAMPLE 6 | 0.5 | 80 | Cu | 1321 | 2.1 | ○ | ○ |
| EXAMPLE 7 | 1.0 | 95 | Fe | 9110 | 3.7 | ○ | ○ |
| EXAMPLE 8 | 1.0 | 95 | Cr | 8302 | 3.3 | ○ | ○ |
| EXAMPLE 9 | 1.0 | 95 | Zn | 6503 | 2.8 | ○ | ○ |
| EXAMPLE 10 | 1.0 | 90 | Y | 8503 | 3.5 | ○ | ○ |
| EXAMPLE 11 | 1.0 | 90 | In | 4689 | 3.9 | ○ | ○ |

In addition, it was confirmed that the same effect was achieved in a system including any one or more of As, Co, Ir, Mg, Os, Pd, Re, Rh, Ru, Se, Sn, Te, W, Zn, Ag, Mo, and Ge.

Although the embodiments of the present invention have been described in detail, it is to be understood that the various change, substitutions, and alterations could be made hereto without departing from the spirit and scope of the invention.

What is claimed is:

1. A ceramic electronic device comprising:
   a multilayer chip in which a plurality of dielectric layers of which a main component is a ceramic and a plurality of internal electrode layers of which a main component is a metal are alternately stacked,
   wherein, in an outermost one of the plurality of internal electrode layers, a metal oxide containing a main component element constituting the plurality of internal electrode layers is provided on an outer main surface of the outermost one, and a formation depth of the metal oxide is 0.5 μm or more and 5.0 μm or less, and
   wherein a segregation layer containing a sub metal element different from the main component metal of the plurality of internal electrode layers is present at an interface between at least one of the plurality of internal electrode layers other than the outermost one and one of the plurality of dielectric layers adjacent to the at least one of the plurality of internal electrode layers.

2. The ceramic electronic device as claimed in claim 1, wherein the metal oxide covers 80% or more of the outer main surface in a cross section including a stacking direction.

3. The ceramic electronic device as claimed in claim 1, wherein the segregation layer has a thickness of 10 nm or less and has a concentration of the sub metal element higher than an average concentration of the sub metal element in the at least one of the plurality of internal electrode layers.

4. The ceramic electronic device as claimed in claim 1, wherein the metal oxide includes at least one of the sub metal element or the main component of the plurality of internal electrode layers.

5. The ceramic electronic device as claimed in claim 1, wherein the sub metal element is one or more selected from Au, Pt, Cu, Fe, Cr, Zn, Y, In, As, Co, Ir, Mg, Os, Pd, Re, Rh, Ru, Se, Sn, Te, W, Ag, Mo, and Ge.

6. The ceramic electronic device as claimed in claim 1, wherein a concentration of the sub metal element in the plurality of internal electrode layers is 0.01 at % or more and 5.0 at % or less with respect to the main component of the plurality of internal electrode layers.

7. The ceramic electronic device as claimed in claim 1, wherein in at least a part of the metal oxide, a metal component of the plurality of internal electrode layers and the sub metal element are arranged without the segregation layer dividing inside of the metal oxide.

8. The ceramic electronic device as claimed in claim 1, wherein the main component of the plurality of internal electrode layers includes at least one of Ni or Cu.

9. A ceramic electronic device comprising:
   a multilayer chip that has a structure in which a plurality of dielectric layers of which a main component is a ceramic and a plurality of internal electrode layers of which a main component is a metal are alternately stacked, and has a substantially rectangular parallelepiped shape, each of the plurality of internal electrode layers being alternately extracted to two end faces of the substantially rectangular parallelepiped shape facing each other,
   wherein at least one of the plurality of internal electrode layers has a metal oxide containing a main component element constituting the plurality of internal electrode layers and having a formation depth of 0.5 μm or more and 5.0 μm or less is provided on ends of two side faces other than the two end faces of the substantially rectangular parallelepiped shape,
   wherein a segregation layer containing a sub metal element different from the main component of the plurality of internal electrode layers is present at an interface between at least one of the plurality of internal electrode layers other than an outermost one of the plurality of internal electrode layers and one of the plurality of dielectric layers adjacent to the at least one of the plurality of internal electrode layers, and
   wherein a number of internal electrode layers in which 60% or more of a thickness thereof is covered with the metal oxide at ends of the two side faces is 80% or more of a total number of the plurality of internal electrode layers.

10. The ceramic electronic device as claimed in claim 9, wherein the segregation layer has a thickness of 10 nm or less and has a concentration of the sub metal element higher than an average concentration of the sub metal element in the at least one of the plurality of internal electrode layers.

11. The ceramic electronic device as claimed in claim 9, wherein the metal oxide includes at least one of the main component of the plurality of internal electrode layers and the sub metal element.

12. The ceramic electronic device as claimed in claim 9, wherein the sub metal element is one or more selected from Au, Pt, Cu, Fe, Cr, Zn, Y, In, As, Co, Ir, Mg, Os, Pd, Re, Rh, Ru, Se, Sn, Te, W, Ag, Mo, and Ge.

13. The ceramic electronic device as claimed in claim 9, wherein a concentration of the sub metal element in the plurality of internal electrode layers is 0.01 at % or more and 5.0 at % or less with respect to the main component of the plurality of internal electrode layers.

14. The ceramic electronic device as claimed in claim 9, wherein in at least a part of the metal oxide, a metal component of the plurality of internal electrode layers and the sub metal element are arranged without the segregation layer dividing inside of the metal oxide.

15. The ceramic electronic device as claimed in claim 9, wherein the main component of the plurality of internal electrode layers includes at least one of Ni or Cu.

16. A ceramic electronic device comprising:
   a multilayer chip in which a plurality of dielectric layers of which a main component is a ceramic and a plurality of internal layers are alternately stacked,
   wherein, among the plurality of internal layers, a plurality of internal electrode layers other than outermost layers have a metal as a main component,
   wherein a whole of the outermost layers is a metal oxide containing the metal of the plurality of internal electrode layers, and
   wherein a segregation layer containing a sub metal element different from the metal of the plurality of internal electrode layers is present at an interface between at least one of the plurality of internal electrode layers and one of the plurality of dielectric layers adjacent to the at least one of the plurality of internal electrode layers.

* * * * *